(12) United States Patent
Pratt et al.

(10) Patent No.: US 8,478,361 B2
(45) Date of Patent: Jul. 2, 2013

(54) HUMAN STIMULUS ACTIVATION AND DEACTIVATION OF A SCREENSAVER

(75) Inventors: James Pratt, Round Rock, TX (US); Marc Sullivan, Austin, TX (US); Steven Belz, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 646 days.

(21) Appl. No.: 12/334,377

(22) Filed: Dec. 12, 2008

(65) Prior Publication Data

US 2010/0153764 A1 Jun. 17, 2010

(51) Int. Cl.
*H04M 1/00* (2006.01)
(52) U.S. Cl.
USPC ......... 455/574; 455/550.1; 455/566; 455/418
(58) Field of Classification Search
USPC ................. 455/574, 550.1, 566, 418
See application file for complete search history.

(56) References Cited

U.S. PATENT DOCUMENTS

| | | | |
|---|---|---|---|
| 2007/0278320 A1* | 12/2007 | Lunacek et al. | 236/94 |
| 2008/0026798 A1* | 1/2008 | Kim | 455/566 |
| 2009/0082066 A1* | 3/2009 | Katz | 455/566 |

* cited by examiner

*Primary Examiner* — Nghi H Ly
(74) *Attorney, Agent, or Firm* — Hartman & Citrin LLC

(57) ABSTRACT

Devices and methods are disclosed which relate to an electronic device having a human stimulus receptor which, when activated, suspends activation of a screensaver. The screensaver is activated to conserve the power and life of the electronic device. When latently viewing the electronic device, however, the human stimulus receptor is activated. A countdown starts counting down a pre-determined amount of time once the human stimulus receptor is inactive. At the expiration of the countdown, the screensaver is activated. The human stimulus receptor responds to skin conductivity, natural muscular twitch, pulse, skin temperature, and/or eye movement. Only when the electronic device no longer detects any of these human stimuli will the countdown begin. A user may set the predetermined amount of time.

18 Claims, 4 Drawing Sheets

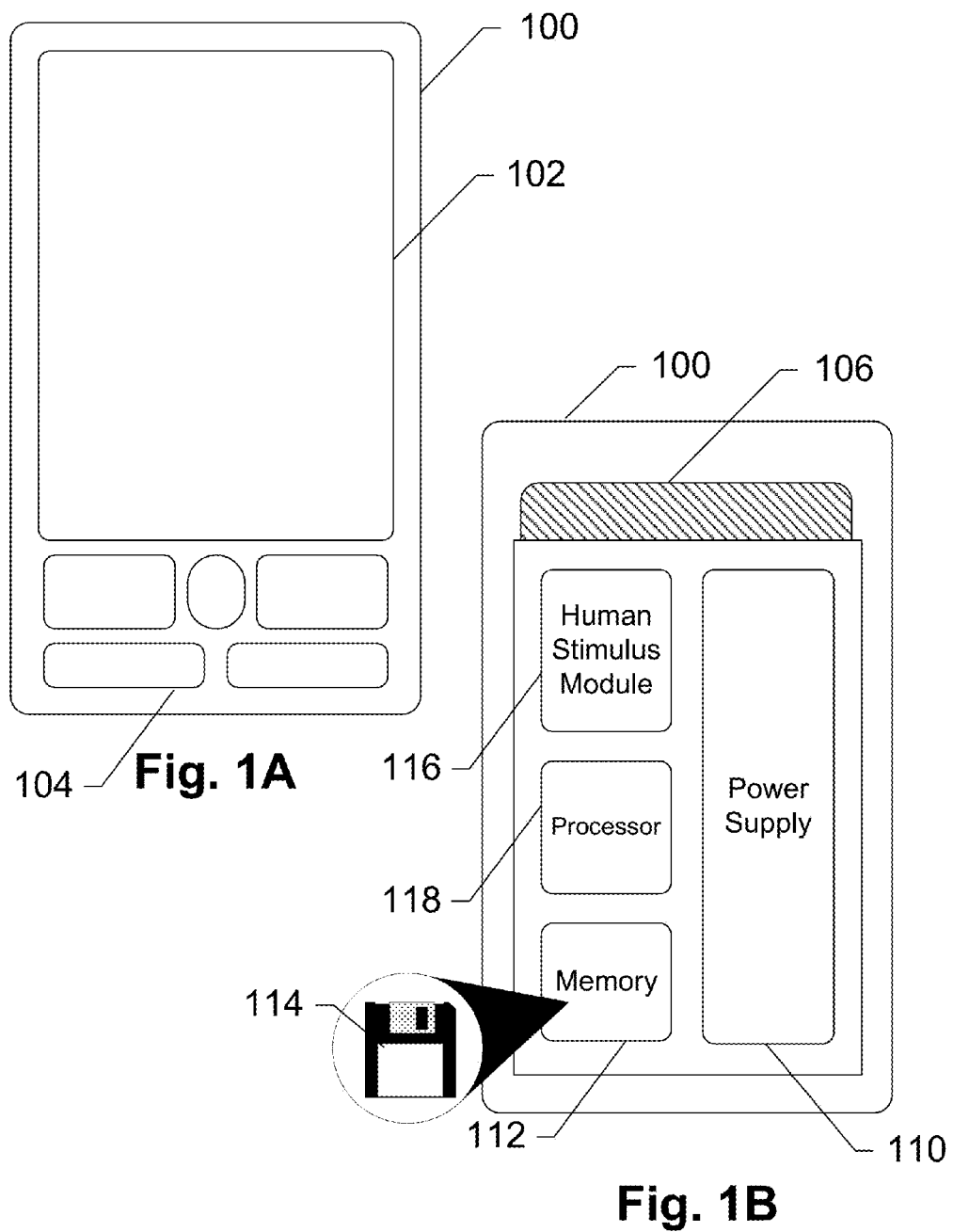

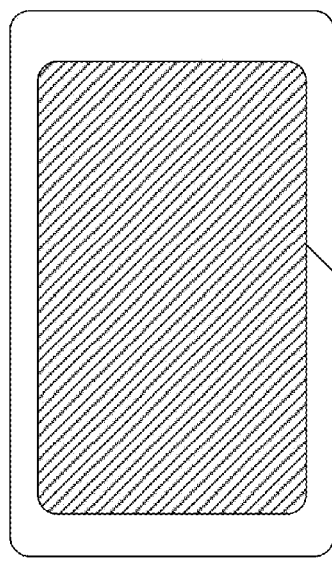
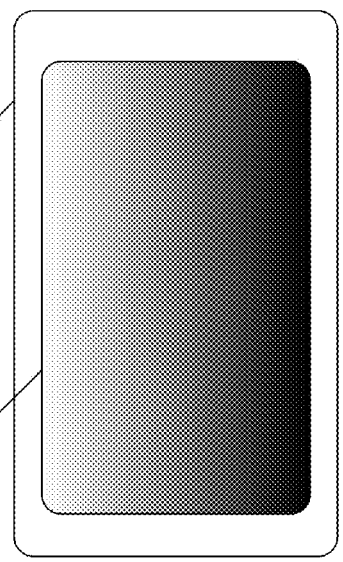
Fig. 2A　　　　　　　　　Fig. 2B
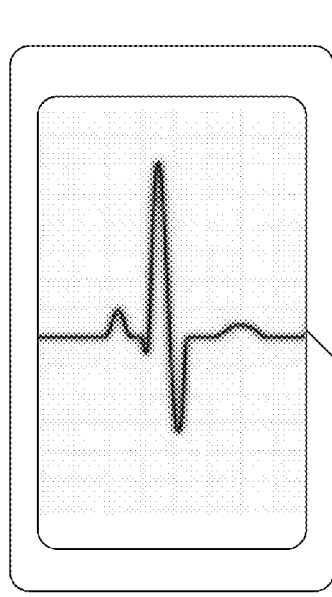
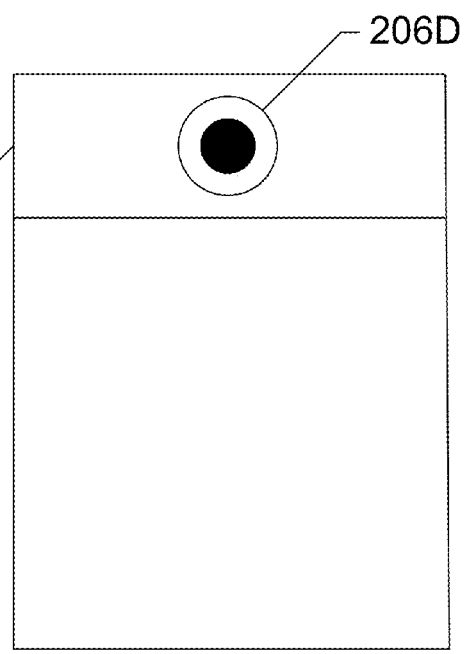
Fig. 2C　　　　　　　　　Fig. 2D

HUMAN STIMULUS ACTIVATION AND DEACTIVATION OF A SCREENSAVER

BACKGROUND OF THE INVENTION

1. Field of the Invention

The present invention relates to the field of electronic devices. In particular, the present invention relates to determinations of whether or not such a device is in use.

2. Background of the Invention

"Screensaver" functionality is a typical attribute of electronic devices. Typically, such a screen will be a blank screen or a screen displaying some standard pattern. Historically, such functionality was built into personal computers to prevent "phosphor burn-in" on Cathode Ray Tube (CRT) screens, but it also came to be built into mobile telephone liquid crystal display (LCD) screens to, for example, prolong battery life. The screensaver on an LCD screen more often simply deactivates the backlight.

The typical method by which a device determines whether or not it is in use is to determine how long it has been since the device has received a user input. If this time exceeds some pre-determined threshold time, the device displays the screensaver. The screensaver is then displayed until the device next receives a user input, whereupon the screen returns to what it displayed before the screensaver was activated.

However, this method of determining whether or not the device is in use presents several drawbacks. First, this method requires a user input to return the display from the screensaver. In some cases, this user input might affect whatever application the user was running on the device. For example, if the device is a mobile telephone and the user is typing a text message when the screensaver comes, the user may hit the letter "A" repeatedly to return the display to the text message. This may cause a series of "A's" to be included in the text message, which the user would have to delete. Second, detecting whether or not any user input has been received in a given time period is, in many cases, a poor way to determine whether or not the device is actually in use. For example, a user of an instant messaging application might need to wait a long time to receive a response from the party he/she is messaging. In such a case, if the time the user waits exceeds the threshold time of the screensaver, then the screensaver is activated even though the user is still using the device. Users can evade this problem by increasing the threshold time of the screensaver, but such a solution still presents problems. Any increased threshold the user selects might not be large enough to prevent the activation of the screensaver for all cases where the user is using the device but not creating any user input. Also, increasing the threshold time means that in cases where the device is not in fact in use, the screensaver will then not be activated for a longer period of time. Third, reception of user input can, in some cases, be an ambiguous signal that the user wishes to return the display to its display prior to the activation of the screensaver. For example, if the user hits an "A" button as a user input to return the device to its display before the screensaver was activated, the user may not know whether or not this input has actually been received by the device. For example, it may not be clear whether or not this button was pressed hard enough for it to be interpreted by the device as user input. For this reason, a user may furiously and repeatedly hit a button upon the display of the screensaver when the device is actually in use.

Research has shown that users of electronic devices not creating any user input nevertheless frequently rest their fingers on the keyboard, touch screen, or other areas of the electronic device. For example, users reading email, web pages, or performing 'vigilance tasks', such as where the user is waiting for some event or for another user to respond to an instant message, frequently rest their fingers on the keyboard of the electronic device.

Furthermore, technologies to detect the presence of a human stimulus, such as the pressure created by fingers resting on a keyboard, are known in the art and recently have been integrated into portable electronic devices. For example, touch screens, which allow users to interact with devices through human touch, are now available. Two-way capacitive transducers and other touch-screen technologies can detect a variety of human stimuli including the conductivity of skin; the specific motions associated with natural muscular twitches; the pressure variations associated with pulse; the temperature of skin; etc. Such technologies use a variety of means and metrics to detect these stimuli, including galvanic response for measuring skin conductivity; capacitive systems utilizing indium tin oxide for measuring the steady pressure of fingers resting on keys; thermocouples for measuring the warmth of the skin; etc. All of these technologies enable humans to interact with devices through the use of human stimulus alone, without intervening buttons or other means of input.

Moreover, as concerns about energy use become widespread, more sophisticated techniques to detect when electronic devices are or are not in use are becoming increasingly important to consumers and producers of such devices.

Thus, there is a clear need for screensaver functionality which uses a method to determine whether or not the device is in use beyond just whether or not the device has received user input.

SUMMARY OF THE INVENTION

The present invention is an electronic device having a human stimulus receptor which, when activated, suspends activation of a screensaver. The screensaver is activated to conserve the power and life of the electronic device. When latently viewing the electronic device, however, the human stimulus receptor is activated. A countdown starts counting down a pre-determined amount of time once the human stimulus receptor is inactive. At the expiration of the countdown, the screensaver is activated. Exemplary embodiments of the human stimulus receptor respond to skin conductivity, natural muscular twitch, pulse, skin temperature, and eye movement. Only when the electronic device no longer detects any of these human stimuli will the countdown begin. A user may set the predetermined amount of time.

In one exemplary embodiment, the present invention is a portable electronic device. The portable electronic device includes a processor, a screen in communication with the processor, a memory in communication with the processor, a screensaver logic on the memory, and a first human stimulus receptor in communication with the processor. The first human stimulus receptor suspends activation of a screensaver upon reception of human stimuli.

In another exemplary embodiment, the present invention is an electronic device. The electronic device includes a processor, a screen in communication with the processor, a power supply in communication with the processor, a memory in communication with the processor, a screensaver logic on the memory, and a first human stimulus receptor in communication with the processor. The screensaver logic instructs the power supply to suspend powering the screen.

In yet another exemplary embodiment, the present invention is a method of conserving the power and life of an electronic device having a human stimulus receptor. The method includes receiving a human stimulus, and suspending activation of a screensaver. The screensaver activates to conserve the power and life of the electronic device.

BRIEF DESCRIPTION OF THE DRAWINGS

FIG. 1A shows a hand-held electronic device, according to an exemplary embodiment of the present invention.

FIG. 1B shows an architecture of a hand-held electronic device, according to an exemplary embodiment of the present invention.

FIG. 2A shows a two-dimensional capacitive transducer coupled with an electronic device, according to an exemplary embodiment of the present invention.

FIG. 2B shows a thermometer coupled with an electronic device, according to an exemplary embodiment of the present invention.

FIG. 2C shows a capacitive transducer coupled with an electronic device, according to an exemplary embodiment of the present invention.

FIG. 2D shows an eye tracker coupled with an electronic device, according to an exemplary embodiment of the present invention.

DETAILED DESCRIPTION OF THE INVENTION

Figure 3:
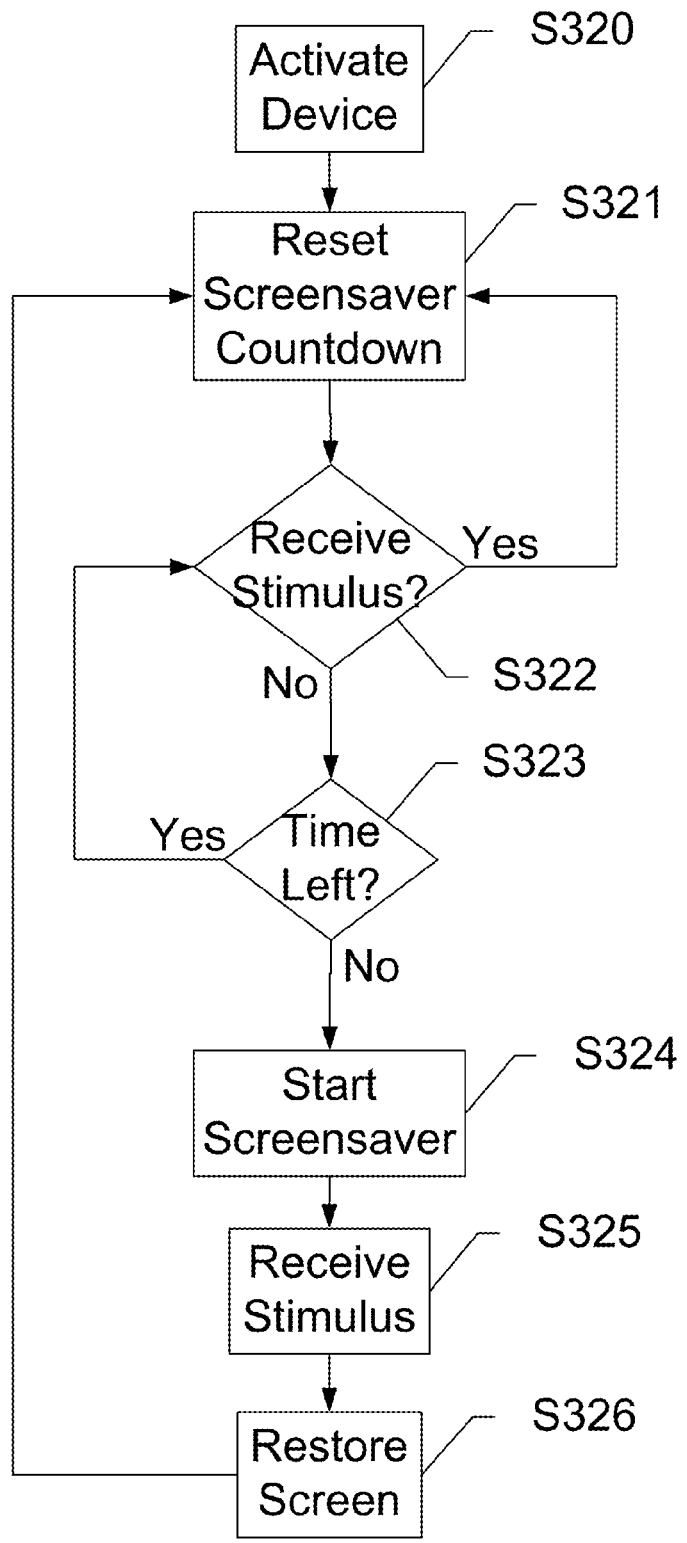
FIG. 3 shows a screensaver logic for using a human stimulus receptor for operation of a screensaver, according to an exemplary embodiment of the present invention.

The present invention is an electronic device having a human stimulus receptor which, when activated, suspends activation of a screensaver. The screensaver is activated to conserve the power and life of the electronic device. When latently viewing the electronic device, however, the human stimulus receptor is activated. A countdown starts counting down a pre-determined amount of time once the human stimulus receptor is inactive. At the expiration of the countdown, the screensaver is activated. Exemplary embodiments of the human stimulus receptor respond to skin conductivity, natural muscular twitch, pulse, skin temperature, and eye movement. Only when the electronic device no longer detects any of these human stimuli will the countdown begin. A user may set the predetermined amount of time.

"Screensaver," as used herein and throughout this disclosure, refers to a screen displayed by a device when it determines that it is not in use. Note that a "blank" screen, produced, for example, by deactivating the backlight of an LCD screen, is also included as a "screensaver" by this definition.

"Human stimulus," as used herein and throughout this disclosure, refers to a stimulus that is created by a human, and to a substantially certain degree only created by a human. Examples of such a stimulus include a pulse, a human skin temperature, a natural muscular twitch, a human eye visual, etc. The exact degree of certainty may vary from stimulus to stimulus.

A "human stimulus receptor," as used herein and throughout this disclosure, refers to a site that can detect the presence of a specific human stimulus. For example, a receptor may be a site on a device that can detect the natural muscular twitch of human muscle. Examples of a human stimulus include natural muscular twitch, temperature of human skin, eye movement, rhythmic pressure pattern, etc.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1A shows a hand-held electronic device 100, according to an exemplary embodiment of the present invention. The hand-held electronic device includes a keyboard 104, and a screen 102. The device architecture in FIG. 1B shows a power supply 110, a human stimulus receptor module 116, a processor 118, a memory 112, and a screensaver logic on the memory 114. Screen 102 is an LCD including a backlight. Keyboard 104 is used for user input such as selecting how much time shall pass before activation of the screensaver. Hand-held electronic device 100 further includes a human stimulus receptor 106 coupled with hand-held electronic device 100. Human stimulus receptor 106 is designed to respond to natural muscular twitches in the hand and fingers. Human stimulus receptor 106 is located on the back of hand-held electronic device 100 where it senses the natural muscular twitches in the user's hand and fingers while holding hand-held electronic device 100. When human stimulus receptor 106 detects no natural muscular twitch for a set amount of time, the backlight of screen 102 is deactivated. Processor 118 is responsible for coordinating the operation of hand-held electronic device 100 and providing for intercommunication between its elements. Memory 112 receives and stores messages from human stimulus receptor module 116 passed via processor 118.

In this embodiment, screensaver logic 114 includes a screensaver countdown. The screensaver countdown counts down from a pre-determined time. If the countdown expires, then screensaver logic 114 activates the screensaver. Processor 118 then orders power supply 110 to cut the power to the backlight of screen 102. Screensaver logic 114 also receives messages from human stimulus module 116 via processor 118. Human stimulus module 116 alerts processor 118 whenever a natural muscular twitch has been received by human stimulus receptor 106. Processor 118 forwards this message to memory 112. Screensaver logic 114 reads the message. If the message indicates that human stimulus has been received, then screensaver logic 114 re-starts the screensaver countdown. If the screensaver is active, screensaver logic 114 sends a request to processor 118 requesting de-activation of the screensaver. Thereupon, processor 118 orders power supply 110 to re-establish power to the backlight of screen 102.

In other exemplary embodiments, the screen is not a backlit LCD, but a cathode ray tube (CRT), LCD projection, digital light processing (DLP) screen, plasma, etc. When the screensaver is activated on these particular embodiments, the power isn't simply cut from the backlight anymore. Either a blank screen or some animation is displayed when the countdown in the screensaver logic expires. That is due in part to the fact that the goal with these screens is to preserve the life of the screen and not the battery powering the screen.

In some exemplary embodiments, the human stimulus receptor is part of a system for allowing the user to enter user input to the electronic device, for example, as part of a touch-screen interface. In other exemplary embodiments, the human stimulus receptor is disposed purely for determining whether or not the device is in use and does not enter user input to the device.

Although in this embodiment, the human stimulus receptor is placed on the back of the hand-held electronic device, in alternative exemplary embodiments, the human stimulus receptor is placed on the keyboard of the hand-held electronic device, the screen of the hand-held electronic device, or any other position suitable for the human stimulus that the human stimulus receptor is designed to receive. The device does not necessarily need to be hand-held, but at least some contact is required for the human stimulus receptor to detect natural muscular twitch. In other exemplary embodiments, however, natural muscular twitch is not the human stimulus detected. Temperature, pulse, and eye movement are among other possibilities of receivable human stimulus. Eye tracking can be achieved by using low power lasers to identify the difference between the iris and the sclera of the eye and they track them. This technology can be mounted near the screen for use in non-hand-held electronics.

FIGS. 2A-2D show four different human stimulus receptors. Each of them detects a different type of human stimulus. They can be used by themselves or in conjunction with other human stimulus receptors.

FIG. 2A shows a two-dimensional capacitive transducer 206A coupled with an electronic device, according to an exemplary embodiment of the present invention. Two-dimensional capacitive transducer 206A responds to the conductivity of the material with which it is in contact by measuring the galvanic response of the material. Two-dimensional capacitive transducer 206A responds well to human skin, and is sensitive to the position and pressure of the human skin. Two-dimensional capacitive transducer 206A is used in conjunction with a human stimulus module loaded with the conductivity of human skin. The human stimulus module reads output from two-dimensional capacitive transducer 206A and records it for observation. By observing the changes in pressure and position the human stimulus module can determine very slight movement, such as natural muscular twitches. Based on the conductivity, position, and pressure, the human stimulus module outputs whether or not a human is touching the electronic device.

FIG. 2B shows a thermometer 206B coupled with an electronic device, according to an exemplary embodiment of the present invention. Thermometer 206B measures the temperature of the material with which it is in contact. Thermometer 206B is used in conjunction with a human stimulus module loaded with the temperature of human skin. Based on a comparison between the temperature of human skin and the temperature of the material in contact with thermometer 206B, the human stimulus module outputs whether or not a human is holding the electronic device.

FIG. 2C shows a capacitive transducer 206C coupled with an electronic device, according to an exemplary embodiment of the present invention. Capacitive transducer 206C responds to variations in pressure. Capacitive transducer 206C is used in conjunction with a human stimulus module loaded with a profile of the pressure variations associated with a human pulse. Based on a comparison between this profile and the observed variations in pressure exerted on capacitive transducer 206C, the human stimulus module outputs whether or not a human is touching the electronic device.

FIG. 2D shows an eye tracker 206D coupled with an electronic device, according to an exemplary embodiment of the present invention. Eye tracker 206D tracks the iris and the sclera of an eye of a user of the electronic device. Eye tracker 206D is used in conjunction with a human stimulus module which determines whether or not the gaze of the user is directed at a screen of the electronic device. Based on this determination, the human stimulus module outputs whether or not an eye is gazing at the screen of the electronic device.

In an alternative embodiment of the present invention, the human stimulus receptor is placed on a keyboard of the electronic device. The human stimulus receptor measures the motion of the site on which it is placed. The human stimulus receptor in this embodiment is used in conjunction with a human stimulus module loaded with a profile of the motion characteristic of the natural muscular twitches of human muscle. Based on a comparison between that motion profile and the motion of the site on which the human stimulus receptor is placed, the human stimulus response module outputs whether or not a human stimulus has been received.

In a different alternative embodiment, the human stimulus receptor measures the steady pressure exerted by the matter with which it is in contact. The human stimulus receptor is used in conjunction with a human stimulus response module loaded with a pressure profile of a finger in contact with the human stimulus receptor. Such a profile allows the electronic device to determine the difference between fingers resting on a keyboard of the electronic device and, for example, coins randomly striking the keyboard when the electronic device is left in the user's pocket. Based on a comparison between that pressure profile and the steady pressure observed on the human stimulus receptor, the human stimulus module outputs a message relating whether or not a human stimulus has been observed.

The placement of the human stimulus receptor is influenced by the type of human stimulus to which it responds. For example, a human stimulus receptor designed to detect the pulse of the human thumb may be placed on both sides of the housing. A human stimulus receptor designed to detect the movements of the human eye may be placed in the center of the screen of the hand-held electronic device. In some embodiments, multiple human stimulus receptors are disposed throughout the hand-held electronic device and respond to different human stimuli. The manner in which a user interacts with the electronic device influences the choice of an appropriate human stimulus receptor. For example, a hand-held device is best suited to a human stimulus receptor that responds to properties of human touch, such as the warmth produced by the skin or natural muscular twitches produced by muscle. An electronic device designed to be looked at by the user, such as a computer monitor, might be best suited to a human stimulus receptor that responds to the human eye.

No matter which or how many human stimulus receptors an electronic device includes, the screensaver logic employs substantially the same basic manner. The screensaver logic starts a countdown after the last input or human stimulus. Once the countdown has expired, the screensaver logic activates the screensaver. Only an input or another human stimulus can defer the countdown.

FIG. 3 shows a screensaver logic for using a human stimulus receptor for operation of a screensaver, according to an exemplary embodiment of the present invention. First, the electronic device is activated S320. Activation of the device can be a user first powering the device, waking the device from standby, etc. Thereupon, a screensaver countdown is started S321. The screensaver countdown continually counts down from a user determined time. Meanwhile, the electronic device checks to see if human stimulus has been received S322. If human stimulus has been received by the electronic device, then the screensaver countdown is re-started S321. If no human stimulus has been received, the electronic device checks the countdown to see if there is any time left in the countdown S323. If there is no time left, then the screensaver is activated S324. If there is time left, then once again the electronic device checks to see if human stimulus has been received S322. Once the screensaver has been activated, it will persist until the electronic device receives human stimulus S325. Then, the screen of the electronic device is restored to its state before activation of the screensaver S326, and the screensaver countdown is re-started S321.

The screensaver logic is implemented in the firmware of the electronic device, in the memory of the device, via a software program monitoring user activity in communication with an operating system of the electronic device, etc.

In an alternative exemplary embodiment of the present invention, the screensaver countdown starts only when notified by the human stimulus module that no human stimulus has been received. In this embodiment, the human stimulus module keeps a record of any human stimulus received over some short time period. If no human stimulus is received over that period, then the screensaver countdown begins. If the countdown expires, then the screensaver is activated. When the human stimulus receptor module next receives human stimulus, the screensaver countdown is re-started and the screen is restored if the screensaver had already been activated.

The screensaver logic activates the screensaver after a user selected period of time. In some exemplary embodiments, the period of time has been predetermined by the manufacturer of the device. In further exemplary embodiments, the period of time depends on the type of human stimulus or input. A user may want to delay activation of a screensaver by a greater amount of time after an input than a human stimulus.

Figure 4:
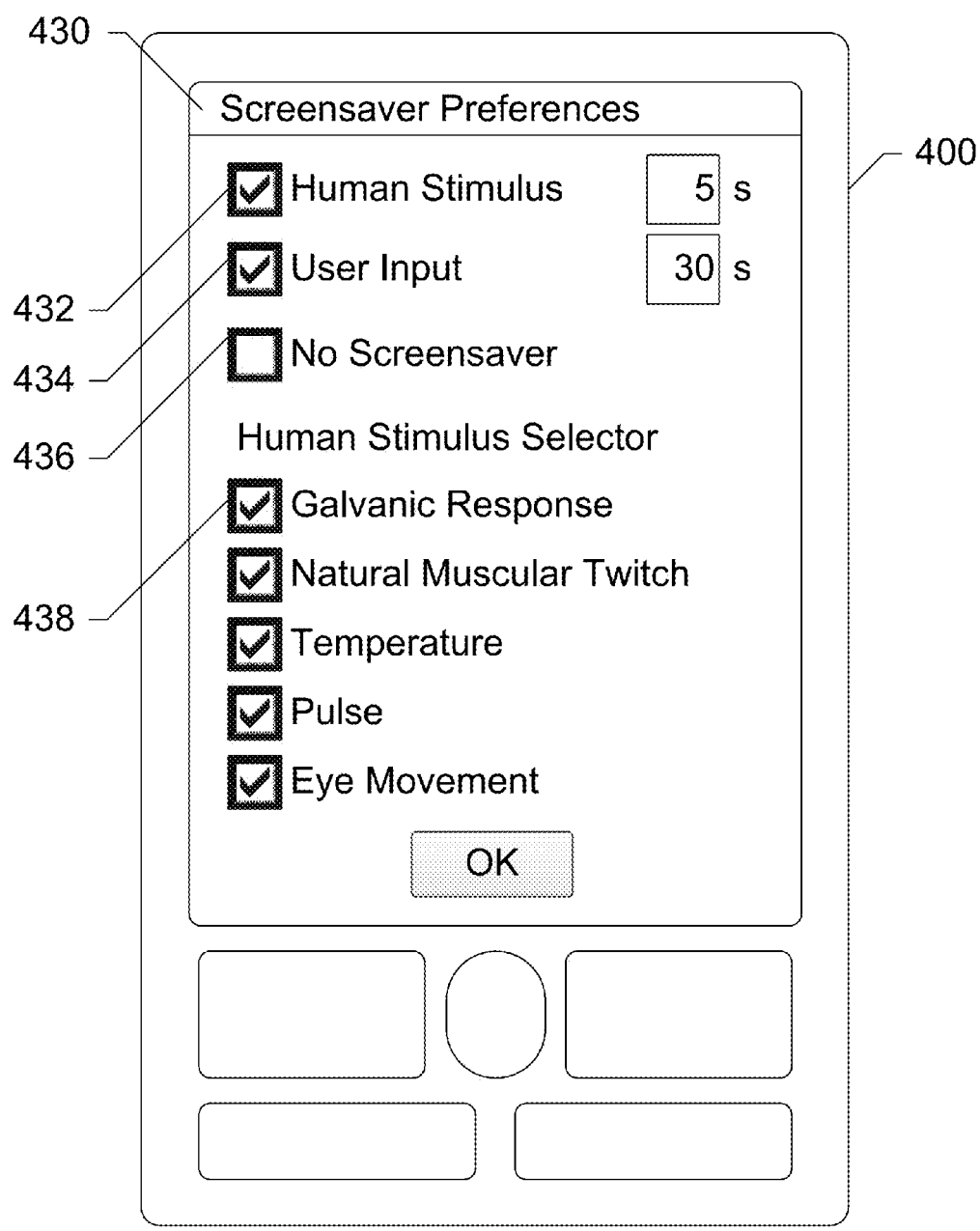
FIG. 4 shows a screenshot of a menu of screensaver options, according to an exemplary embodiment of the present invention.

FIG. 4 shows a screenshot of a menu 430 of screensaver options, according to an exemplary embodiment of the present invention. A human stimulus option 432 allows the screensaver to be activated based on a human stimulus. If a human stimulus is not received before the countdown expires, then the screensaver is activated. Selection of this option prompts a user of the electronic device to enter a value, in seconds, from which the screensaver countdown begins. A user is able to select a countdown value of zero, meaning that whenever the electronic device is not receiving human stimulus the screensaver is activated. Such an option might be preferable for an energy-conscious user. A user input option 434 allows the screensaver to be activated based on a user input. If a user input is not received before the countdown expires, then the screensaver is activated. Selection of this option prompts the user to enter a value, in seconds, from which the screensaver countdown begins. Selecting a no screensaver option 436 deactivates the first two options and ensures that the screensaver is never activated. In this embodiment, electronic device 400 includes a plurality of human stimulus receptors. Human stimulus receptor option 438 allows the user to select which of the human stimulus receptors are active and can receive human stimulus. For example, the user can select a human stimulus receptor to actively sense human stimulus and de-activate all other human stimulus receptors. Here the user has selected the human stimulus option 432, the user input option 434, and all of the human stimulus receptors 438.

In other exemplary embodiments with more types of human stimulus receptors, the user can select pulse and temperature stimulus to deactivate the screensaver or reset the screensaver countdown. Other combinations of human stimulus can be selected for use by the user.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A portable electronic device comprising:
a processor; and
a memory in communication with the processor, the memory storing instructions that are executed by the processor to perform operations comprising:
starting a first timer upon receiving a first human stimulus at a first human stimulus receptor in communication with the processor,
starting a second timer upon receiving a second human stimulus at a second human stimulus receptor in communication with the processor, wherein the second timer is greater than the first timer, and
activating a screen saver upon expiration of both the first timer and the second timer.

2. The device of claim 1, wherein the first human stimulus receptor is a two-way capacitive transducer.

3. The device of claim 1, wherein the first human stimulus receptor is coupled with one or more of a keyboard, a screen, or a housing of the electronic device.

4. The device of claim 1, further comprising one or more of a laptop, a personal digital assistant, a cellular telephone, or a digital music player.

5. The device in claim 1, wherein the second human stimulus receptor is an input device.

6. The device of claim 5, wherein the operations further comprise receiving a selection of a function of the first human stimulus receptor and the second human stimulus receptor.

7. An electronic device comprising:
a processor; and
a memory in communication with the processor, the memory storing instructions that, when executed by the processor, cause the processor to perform operations comprising:
instructing a power supply in communication with the processor to suspend powering a screen in communication with the processor upon expiration of a first period of time after receiving a first human stimulus from a first human stimulus receptor, and after a second period of time after receiving a second human stimulus from a second human stimulus receptor,
wherein the first period of time is greater than the second period of time.

8. The device of claim 7, wherein the first human stimulus receptor is a two-way capacitive transducer.

9. The device of claim 7, wherein the first human stimulus receptor is coupled with one of a keyboard, the screen, or a housing of the electronic device.

10. The device of claim 7, further comprising one or more of a laptop, a personal digital assistant, a cellular telephone, or a digital music player.

11. The device of claim 7, wherein the second human stimulus receptor is an input device.

12. The device of claim 11, wherein the operations further comprise receiving a selection of a function of the first human stimulus receptor and the second human stimulus receptor.

13. A method comprising:
   determining, by a mobile device comprising a processor, a first period of time after receiving a first input at a first input device coupled to the mobile device;
   determining, processor, a second period of time after receiving a second input at a second input device coupled to the mobile device; and
   activating, by the processor, a screensaver after expiration of both the first period of time and the second period of time;
   wherein the first period of time is greater than the second period of time.

14. The method of claim 13, further comprising maintaining suspension of screensaver activation until both the first period of time and the second period of time expire.

15. The method of claim 13, further comprising de-activating the screensaver upon reception of an input.

16. The method of claim 13, further comprising activating the screensaver upon determining that no input is received for a pre-determined amount of time.

17. The method of claim 13, wherein the input comprises one or more of a natural muscular twitch, a temperature, a pulse, or an eye movement.

18. The method of claim 13, further comprising resetting the first period of time and the second period of time.

* * * * *